Aug. 15, 1961  L. E. DE NEERGAARD  2,996,625
POSITION INDICATING SYSTEM
Filed April 7, 1958  4 Sheets-Sheet 3
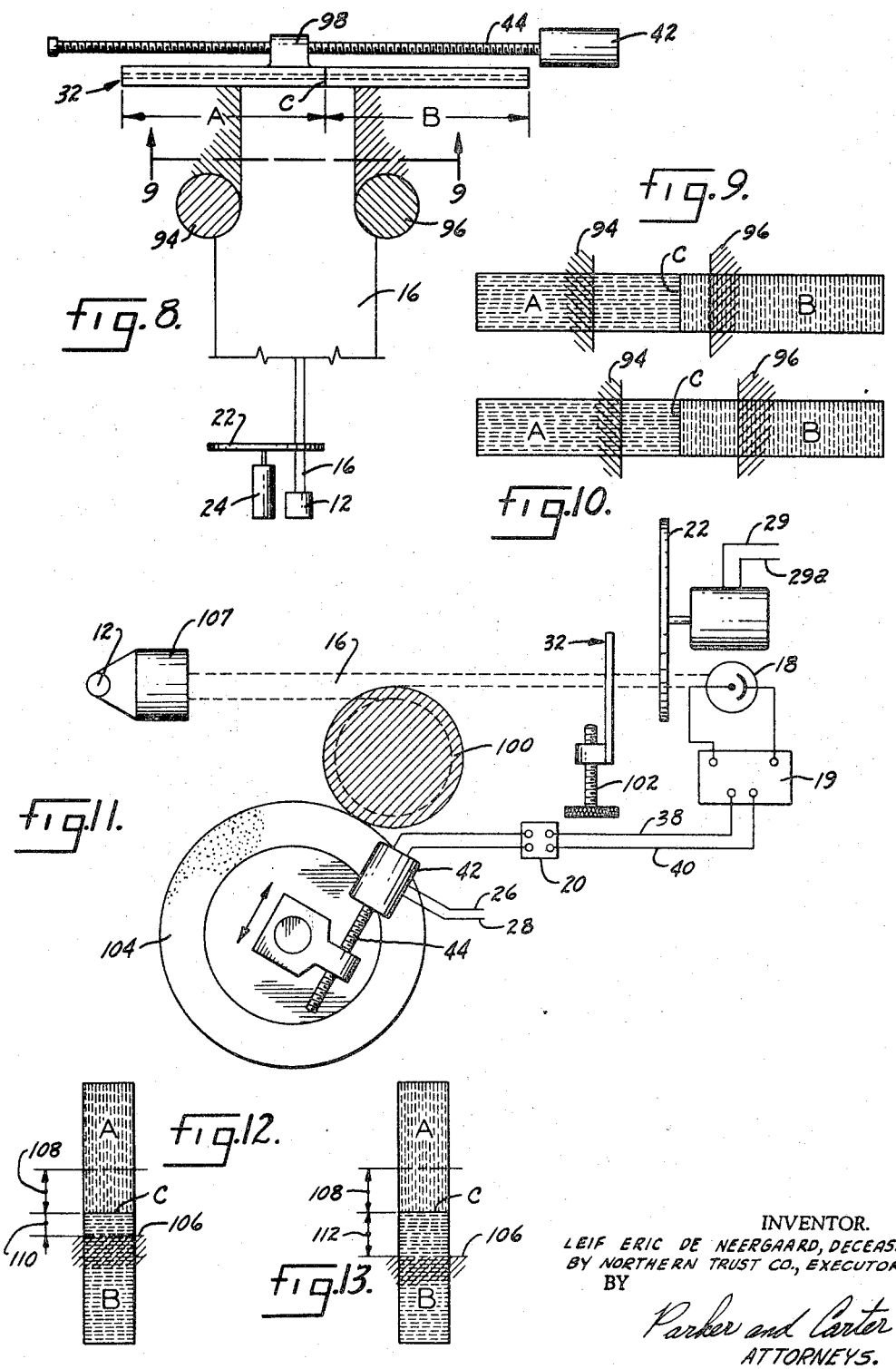
INVENTOR.
LEIF ERIC DE NEERGAARD, DECEASED
BY NORTHERN TRUST CO., EXECUTOR
BY
Parker and Carter
ATTORNEYS.

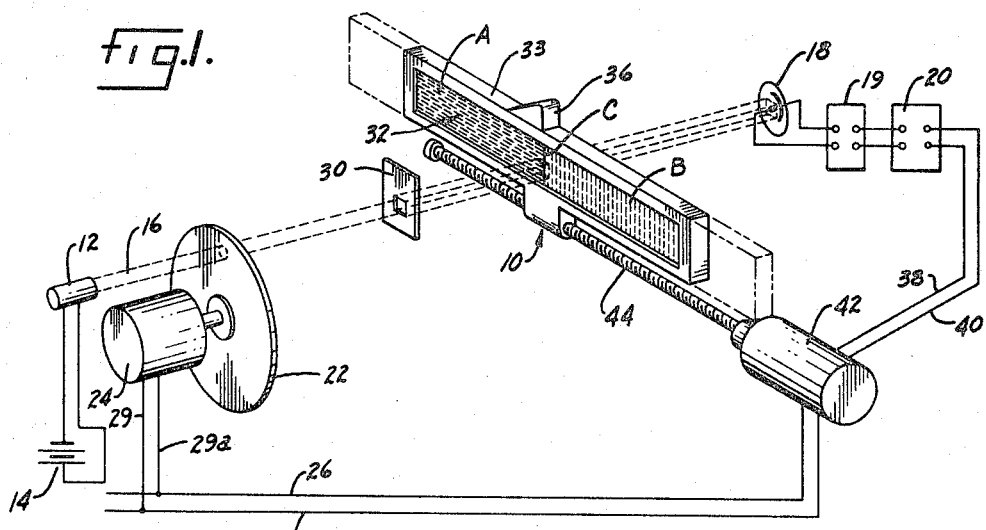
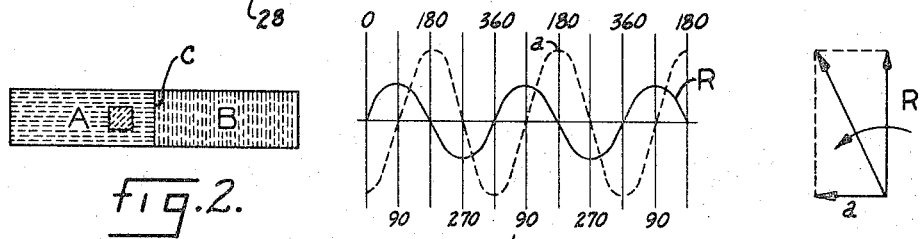
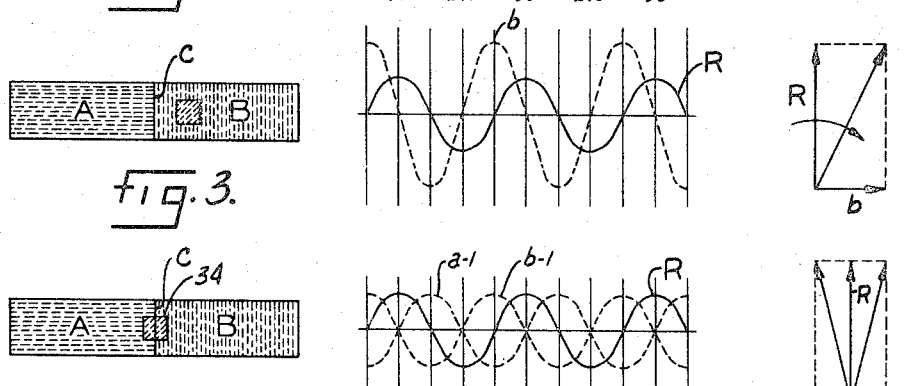
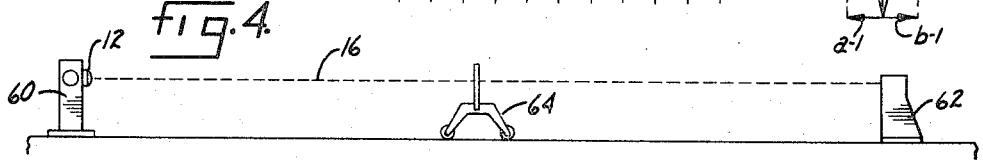

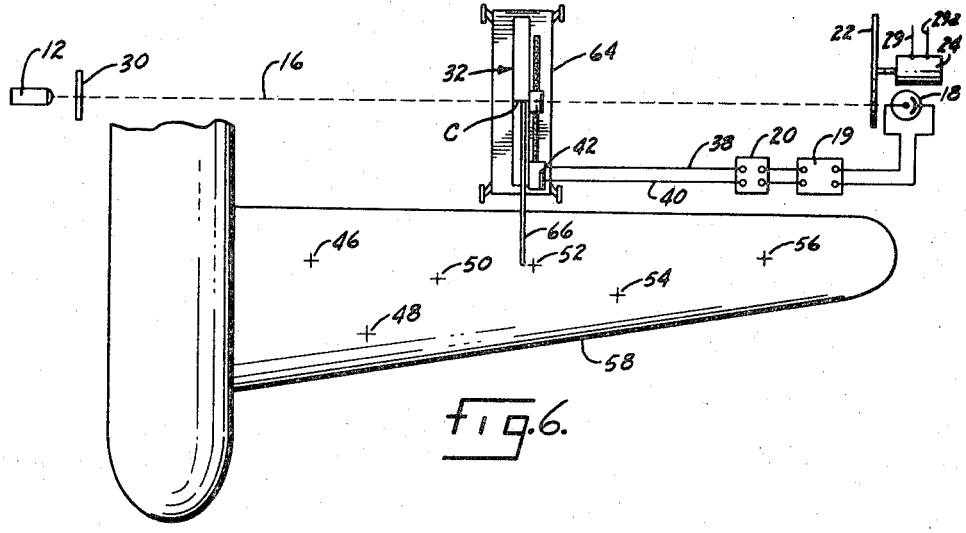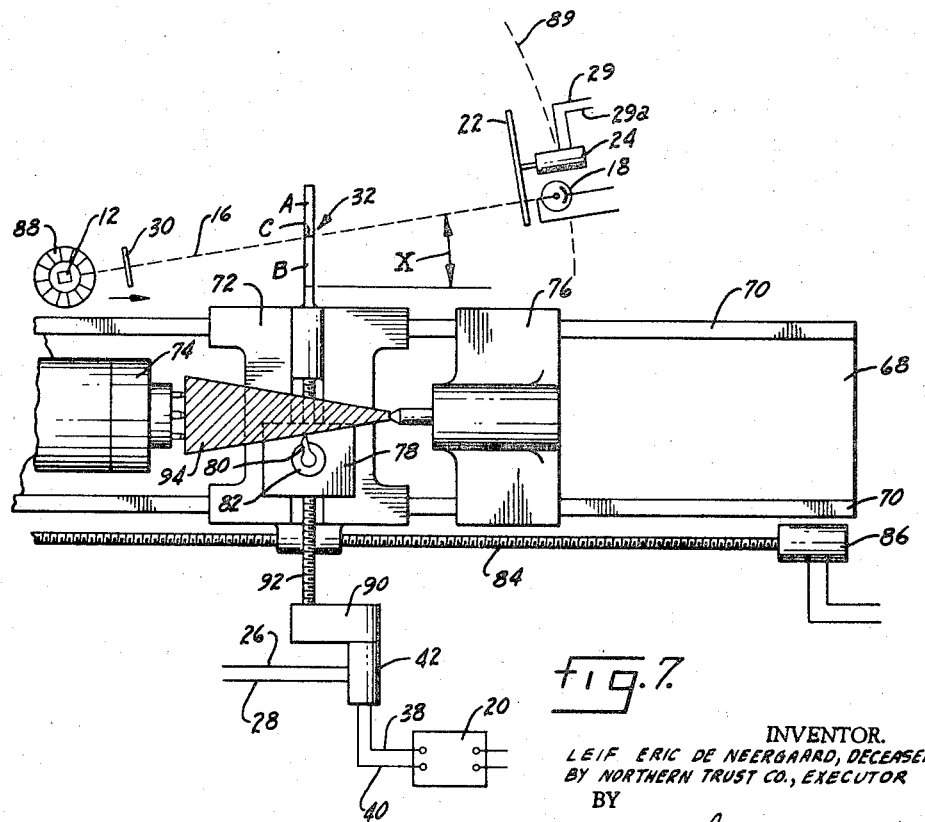

United States Patent Office

2,996,625
Patented Aug. 15, 1961

2,996,625
POSITION INDICATING SYSTEM
Leif Eric De Neergaard, deceased, late of Madison, Wis., by The Northern Trust Company, executor, Chicago, Ill., assignor to Frederic W. Olmstead, Washington, D.C., Hans W. Trechsel, Madison, Wis., Deryck A. Gerard, Minneapolis, Minn., and Norman S. Parker, Evanston, Ill., trustees.
Filed Apr. 7, 1958, Ser. No. 726,994
17 Claims. (Cl. 250—225)

This invention is directed to a highly precise method and apparatus for locating an object, point or line at a predetermined position with respect to a reference line or plane or for measuring the distance between two points or lines.

A primary object of the invention is the creation of an electrical system for accurately locating an object at a predetermined position with respect to a reference line or for measuring the distance of the object from the reference line which does not depend upon accuracies of mechanical instrumentalities.

Another object is a system for locating an object at a predetermined position with respect to a reference line which is effective over a wide range of distances.

Another object is an electrical system for locating an object at a predetermined position with respect to the optical axis of a beam or pencil of light flux.

Another object is a system for insuring true and accurate parallelism between two lines that may be a comparatively wide distance apart, on the order of 40 or 50 feet, while insuring that the lines maintain their parallel relation over a wide range of distance on the order of 100 or more feet.

Another object is a servo mechanism system for controlling the position of an object which locates the object at a predetermined position with respect to the optical axis of a light beam.

Another object is an optical position determining system which requires only one light source.

Another object is an optical system of the above type which requires only one light source and one photocell or pick-up so that practically all optical degradations or inaccuracies are eliminated.

Another object is an optical positioning system arranged so that practically all possible errors are cancelled out.

Another object is a system of the above type which is not effected by outside light.

Other objects will appear from time to time in the ensuing specification and drawings in which:

FIGURE 1 is a diagrammatic perspective of one embodiment of my invention;

FIGURE 2 is a side view showing one position of a polaroid panel used in the invention and a graphic representation of the signal generated therefrom;

FIGURE 3 is a side view similar to FIGURE 2 showing the panel in a different operative position and a graphic representation of the signal generated therefrom;

FIGURE 4 is a side view similar to FIGURE 2 showing the panel in a third operative position and a graphic representation of the light beam amplitudes;

FIGURE 5 is a diagrammatic side view of another form of the invention;

FIGURE 6 is a diagrammatic side view of the FIGURE 5 form;

FIGURE 7 is a diagrammatic plan view of another form of the invention;

FIGURE 8 is a diagrammatic plan view of still another form of the invention;

FIGURE 9 is a side view showing one position of the polaroid panel used in the FIGURE 8 form;

FIGURE 10 is a side view similar to FIGURE 9 showing the panel in a different operative position;

FIGURE 11 is a diagrammatic side view of another form of the invention;

FIGURE 12 is a side view showing one condition of the polaroid panel used in the FIGURE 11 form;

FIGURE 13 is a side view, similar to FIGURE 12, showing a different operative condition;

Figure 14:
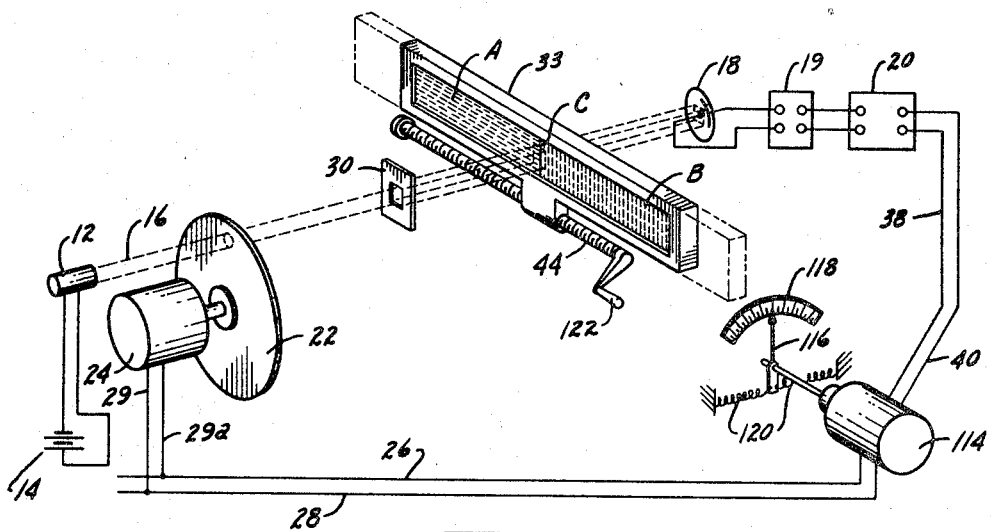
FIGURE 14 is a diagrammatic perspective of another form of the invention.

Referring first to FIGURE 1, an object or frame is indicated at 10, the position of which is to be controlled. The object 10, while shown in FIGURE 1 in the form of a frame with a lug actuated by a motor, may be taken as representative of any desired member to be accurately positioned. The object may, for example, be considered as representative of a cutting tool, the position of which is to be accurately controlled with respect to a reference point. It may be a workpiece which is adapted to assume or be moved or disposed at a predetermined position with relation to a reference point. In other uses of the invention it may be representative of a movable element in a process control system wherein the element is to be positioned at a predetermined point or location with respect to a reference line.

In any event, a light source 12 of any suitable type is preferably supplied with direct current from any suitable source, such as a battery 14, and is adapted to project a beam of light, represented by broken lines at 16 in FIGURE 1, through a predetermined spatial path onto the light-sensitive area of a light-sensitive element 18, which may take the form of a photocell. The optical axis of the beam of light may be considered as a reference line with respect to which the object 10 is to be positioned. The photocell 18 may be any suitable or conventional photocell which may be a variable resistance element adapted to pass varying amounts of current in proportion to the intensity of the light received by or falling on it. Or it might be a transducer which produces a current flow or voltage proportional to incident light. The current or signal is transmitted to a transformer 19 and thus a suitable amplifier diagrammatically represented at 20.

A polaroid disk 22 is disposed in the beam of light and is adapted to be rotated at a generally constant speed by a motor 24, for example, a four pole synchronous motor. The synchronous motor 24 may be supplied with alternate current from any suitable mains 26 and 28 by suitable leads 29 and 29a, and is adapted to rotate the disk 22 at a speed which is precisely one-half the frequency of the current supplied from the mains. Thus, if the frequency in the mains is 60 cycles per second, then the speed of rotation of the disk 22 will be 30 revolutions per second or 1800 r.p.m. The planes of polarization of the disk are all parallel to a given diameter. Assuming, for purposes of illustration, that the axis of rotation of the motor and disk is horizontal or generally so, during rotation of the disk 22, the plane of polarization of the disk will be generally horizontal with respect to the beam of light twice during each revolution of the disk and will also be generally vertical with respect to the axis of the light beam twice during each revolution. Since the light beam passes through the disk before reaching the photocell, and the plane of polarization of the disk is uniformly and cyclically varying, the beam will acquire the cyclically varying polarity of the disk. Since in a synchronous motor the angular disposition of the motor shaft always bears a fixed and definite relation to the phase of the sinusoidally varying electrical current from the mains at any instant, it will be seen that the particular disposition of the plane of polarization of the disk in the light beam at any instant will depend upon the instantaneous position of the phase angle of the current supplied from the mains to the motor 24. It will be assumed that the frequency of the current from the mains is constant and the phase angle of this current may be hereinafter referred to as the base or reference point in determining the phase angle of a sinusoidally varying phenomena.

A suitable light mask or stop 30 is shown as positioned in the beam of light to bring the beam down to the proper size, which might be referred to as a light pencil. A collimating lens may be employed, where desired, in order to advantageously focus the beam of light upon the photocell 18, but I have not shown one.

The object is either formed as an integral part of or carries or is associated with a second polaroid member 32 which is disposed in the beam of light and in FIGURE 1 is shown as integral with the object 10. The second Polaroid member 32 has two sections or panels A and B in a suitable frame 33. While the two panels A and B have been shown horizontally side by side in FIGURE 1, they might be disposed vertically one above the other or at any suitable angle. The plane of polarization in the panel or section A is best precisely and accurately at right angles to the plane of polarization in panel or section B, which means that their planes of polarization are oriented at precisely 90°. For example, the plane of A is shown as exactly horizontal in FIGURE 1, while the plane of B is exactly vertical. These two panels meet at a common boundary line C, which may be assumed to be at the center of the frame or Polaroid member 32 or at a predetermined position relative to the object 10.

When the center line C between Polaroid panels A and B coincides precisely with the optical axis of the light pencil, equal light intensity or luminosity will pass through each of the panels A and B. This condition is diagramatically shown in FIGURE 4. The light beam 34 falls on equal amounts or proportions or passes through equal areas of each of the panels A and B. The frame 33 may have an integral abutment or shoulder 36 which coincides precisely with a vertical extension of the boundary line C. Measurements of dimensions may be taken from the shoulder 36, and while I have shown it as coincident or coplanar with the line C between the panels A and B, it might be offset by a predetermined distance. And it might be other than a shoulder. But it is related to the boundary C between the panels. When the frame is moved in one direction so that the boundary line C between the Polaroid panels A and B is to the right of the axis of the light beam and completely beyond the boundary of the light beam, the beam will fall entirely on and pass through the panel A, as in FIGURE 2. Conversely, when the frame is moved in the other direction so that the center line C between the two Polaroid panels A and B is to the left of the axis of the light beam, and completely beyond the boundary of the light beam, the beam will fall entirely on and be modulated by Polaroid panel A, as in FIGURE 3.

The amplifying unit 20 delivers a control signal, described more fully hereinafter, by leads 38 and 40 to a two phase motor 42 of a servo system which moves the object 10. The object is shown as being adapted for movement by a screw 44 which will move the frame either left or right. The screw 44 may be rotated directly by the two phase motor 42. The windings of the motor are supplied with current from the mains 26 and 28, which is at the base or reference frequency and phase angle. The other winding of the motor is supplied with the control signal from the amplifying unit 20.

FIGURE 4 is representative of a balanced condition. Each part of the light pencil through the A and B panels gives a separate sinusoidally variable amplitude light on the photocell which functions as an adder or summing element. When a balanced condition exists, the signal from the photocell gives a steady state D.C. to the primary of the transformer 19 which then gives no output signal on its secondary. But when an unbalanced condition exists, as set forth and explained hereinafter, a pulsating D.C. current will be supplied from the photocell to the primary which results in an A.C. signal from the secondary of the transformer.

In a motor of this type, the output shaft and screw 44 will be stationary when the reference signal from the mains and control signal from the photocell and amplifier are in precise phase with one another. The motor is reversible and will rotate the screw in one direction when the control signal is out of phase with and leads the reference signal or will rotate the screw in the opposite direction when the control signal is out of phase with and lags the reference signal with torque proportional to the displacement of the frame from the light beam reference or optical axis and in such direction as to restore a balanced condition.

The control signal is caused to lead the reference signal when the object 10 is at the position corresponding to FIGURE 2, wherein the object is fully to the right of the desired position or reference line defined by the light beam. In this condition the control signal causes the two phase motor 42 to rotate the screw 44 in a direction to move the object 10 to the left. When the object is fully to the left of the desired position, as in FIGURE 3, the control signal is caused to lag the reference signal and thus causes rotation of the motor shaft in the opposite direction resulting in movement of the object to the right. While movement of the object has been shown as horizontal in FIGURE 1, it might be vertical, inclined, rotary or otherwise.

Positioning of the disk 22 is important since, by any suitable simple mechanical adjustment, it should be shifted and set on the shaft of motor 24 so that the plane of polarization of the disk is precisely 45° out of phase with the frequency of the base or reference signal. Since the plane of polarization in the disk 22 bears a fixed and definite position with respect to the shaft of the motor 24 and, therefore, with respect to the cyclic position of the reference signal supplied to the motor, it will be seen that at any instant the cyclic disposition of the reference signal supplied to the motor 42 is a fixed and precise function of the angular position of the plane of polarization in the disk 22. Since the planes of polarization in the panels A and B are precisely at right angles to each other, the frequency of a signal from the amplifier produced by the photocell 18 as a result of light passing only through panel A will have a precise 180° out-of-phase relation to the frequency of a signal by reason of light passing only through panel B.

FIGURES 2, 3 and 4 also graphically represent the control signals or light amplitudes in response to the positions of the panels A and B as illustrated in those figures. In FIGURE 2, for example, the control signal induced as a result of light passing totally through the panel A will be a signal of sine-wave form. The control signal is presented at $a$ on a graph of a time axis plotted against the amplitude of the signal and shows the condition of the modulated light falling on the cathode of the photocell when the beam of light is passing only through Polaroid panel A. The reference signal is indicated at R and it will be noted that the control signal $a$ lags the reference signal by precisely 90°. I have also shown the signal $a$ vectorily as 90° out-of-phase with the reference signal R.

In FIGURE 3 the condition of the control signal induced as a result of the modulated light passing only through polaroid panel B is diagrammatically represented at $b$ on a graph of a time axis plotted against the amplitude of the signal. Again, the reference signal is indicated at R, and it will be noted that the control signal $b$ leads the reference signal by precisely 90°. I have also shown signals $b$ and R vectorily.

A comparison of FIGURES 2 and 3 will show that the two signals *a* and *b* are precisely out-of-phase with one another due to a shift of the light modulation by 180 electrical degrees. Also, the amplitude of signals *a* and *b* is precisely the same and is shown as approximately twice the amplitude of the reference signal. When all of the light passes through Polaroid panel A, the single signal *a* induced in the photocell has a maximum amplitude which occurs twice for each full revolution of the disk 22. If we assume that the reference signal has a frequency of 60 cycles per second, the signal *a* transmitted by the amplifier 20 will also have a frequency of 60 cycles per second since the motor 24 rotates its shaft and the disk 22 at 30 revolutions per second. Similarly, when all of the light passes through Polaroid panel B, the signal *b* induced in the photocell will also have a frequency of 60 cycles per second but 180° out-of-phase with the *a* signal resulting from a shift of the light modulation by 180°.

When the boundary line C between the Polaroid panels A and B coincides with the precise optical axis of the beam of light, as represented in FIGURE 4, in effect two light signals will be received by the photocell. Each will be a 60 cycle signal but with precisely one-half the amplitude of signals *a* and *b* since the luminosity passing through each panel is precisely one-half of that in FIGURES 2 and 3. However, since these half amplitude signals will be precisely out-of-phase with one another by 180°, they will exactly balance and will produce a steady state D.C. to the transformer primary and no signal at the secondary. Thus, control signal will result.

This condition is also graphically represented in FIGURE 4. It should be noted that the amplitude of each signal, *a*–1 corresponding to *a* in FIGURE 2, is representative of the light falling on Polaroid panel A, and *b*–1 corresponding to *b* in FIGURE 3, is representative of the light falling on Polaroid panel B, is one-half of the amplitude of the signals shown in FIGURES 2 and 3.

FIGURE 4 graphically represents the balanced condition where no control signal will be generated while FIGURES 2 and 3 graphically represent the maximum unbalanced condition in each direction where the maximum control signals will be generated. Various signals will be generated at the intermediate positions. For example, when a minor portion of the luminosity passes through Polaroid panel A and the majority of the luminosity passes through Polaroid panel B. In this case a lagging *b* type signal will be generated which will be the resultant of the *b* type signal less the *a* type signal, and vice versa. Hence, movement of the object in opposite senses will occur in accordance with whether a leading or lagging control signal is supplied to the motor 42 in response to various positions of the frame. In effect, the frame and bench mark 36 "home" on the precise optical axis of the light beam.

When the object 10 is on one side of the desired position, as in FIGURE 2, the motor 42 will rotate in one direction and will cause movement of the bench mark 36 in the opposite direction. When the object is on the other side of the desired position, as in FIGURE 3, the motor will rotate in the opposite direction to move the bench mark in the other direction, in each case, to bring about the balanced condition shown in FIGURE 4.

In FIGURES 5 and 6 the system is shown, slightly modified. The system is shown as applied to the location of reference points or a reference line or lines with respect to a predetermined base line extending over a comparatively large distance. The system is illustrated in connection with the location of a series of reference lines or points, such as at 46, 48, 50, 52, 54 and 56, which are on, for example, an aircraft wing 58.

For purposes of clarity, I shall use the same reference numerals in these and subsequent figures, as I used in FIGURE 1, for the same elements. In this use of the system, the light source 12 may be positioned on a platform 60. The narrow beam of substantially parallel light 16 is projected to the photocell 18 and amplifying unit 20. The rotating Polaroid disk is driven by the motor 24 which is supplied with reference current through leads 29 and 29*a*. The light stop 30 is interposed at a suitable location. The photocell and amplifier, Polaroid disk and drive motor may all be mounted on a suitable frame 62. The divided Polaroid panel 32 may be movably mounted on a platform 64. The platform may be mounted on tracks or wheels or the like so that it may be moved from one position to another between the frames 60 and 62 along the beam 16. The split phase motor unit 42 for moving the Polaroid panel may be mounted on the platform or frame 64 for moving the panel in a direction at right angles to the beam 16. The dual section Polaroid panel may have or carry a suitable gauge bar 66 which extends toward and over the wing section 58. Since the gauge bar is movable with the movable Polaroid panel, the gauge bar will always be in a predetermined position with respect to the axis of the beam of light. Hence, the gauge bar may be employed to locate the various points on the wing section, while insuring that each of the points is precisely located relative to the axis of the beam of light. The motor 42 may be connected to the photocell 18 through suitable lines diagrammatically represented at 38 and 40.

In this embodiment of the invention, the frame 64 may be a simple cart or dolly which may simply be wheeled along the beam of light. Movement of the divided Polaroid panel 32 to one side or the other of the beam of light is automatically compensated for by movement of the divided frame member and reference line C back to the precise center of the light beam with attendant movement of the gauge bar 66.

In any longitudinal position of the platform 64, the split phase motor 42 in response to a control signal from the photocell and amplifier will "home" or center the dividing line C of the divided Polaroid panel on the exact center of the narrow beam 16 of substantially parallel light. Movement of the Polaroid panel moves the gauge bar 66, and a series of points may be struck on the wing 58 to establish one or more reference lines on the wing. The gauge 66 could be any predetermined length and could be changed from time to time, as desired. Or it might be a measuring device. The arrangement has immense flexibility and the light source 12 and photocell 18 might be, for example, 100 feet apart.

In FIGURE 7, a diagrammatic plan view, a further modification, embodiment, or use of the invention is shown. A conventional engine lathe having a bed 68 with slides or ways 70 supporting a carriage 72 for movement along the ways between a suitable chuck 74 at the head end and a tail stock 76 which may be mounted for longitudinal adjustment along the ways. The carriage supports a suitable tool slide 78 mounted for lateral movement across or at right angles to the ways of the bed, and a suitable cutting tool 80 may be supported on a tool post 82 carried on the tool slide. A longitudinal lead screw 84 driven by a suitable electric motor 86 or the like rotates to control the movement of the carriage 72 longitudinally and a suitable speed reducer, not shown, may be used.

The same reference numerals will be applied to the same parts that appear in the previous forms. For example, the light source 12 is suitably disposed behind the bed and I provide a suitable adjustment ring 88 so that the direction of the light beam 16 may be adjusted to vary the angle X between the light beam 16 and the axis of the lathe bed. The photocell 18 and rotating Polaroid disk 22 with its four pole synchronous motor 24 are shown as mounted at a suitable location behind the bed to receive the light beam, in substantially the same manner as set forth hereinabove. But in FIGURE 7 I prefer that the photocell and Polaroid disk be adjustably mounted, for example, such as on an arc 89 struck about the center of the light source 12 so that the angle X may be varied at the will of the operator.

The Polaroid panel 32 with the A and B Polaroid sections or panels may be suitably attached to the tool slide 78 so that longitudinal movement of the carriage along the ways 70 will move the frame 32 longitudinally and lateral movement of the tool slide 78 will move the frame laterally. The light stop 30 may be suitably positioned so as to be adjusted with the light source and photocell. The leads from the photocell 18 may extend to the amplifier 20 which, through the leads 38 and 40, is connected to the split phase motor 42 to supply the control signal to the motor's armature winding, while the reference signal is brought into the motor's field winding by the mains 26 and 28. The power shaft from the motor 42 may be connected directly to a suitable speed reducer 90 which may have a suitable gear ratio. The output from the speed reducer is connected directly to a lead screw 92 which controls the movement of the cross slide 78.

As the carriage 72 moves from right to left in FIGURE 7 in response to rotation of the lead screw 84 by the motor 86, the frame 32 will also move from right to left. Since the light beam 16 is at a predetermined angle to the movement of the carriage as shown at X, the center or boundary line C between the Polaroid panels A and B will tend to move to the left of the light beam 16, considering the beam from the head end of the lathe, thereby providing more of the B panel than the A panel in the light beam, similar to the FIGURE 3 condition. Accordingly, a b type signal will be communicated to the motor 42 causing rotation of the lead screw 92 in a direction to withdraw the tool slide 78. Such withdrawal of the tool slide, which carries the Polaroid frame 32, brings the center or boundary line C back to the center of the light beam to create the balance condition, similar to FIGURE 4. Withdrawal of the tool slide 78 withdraws the tool 80 resulting in a tapered cut on the workpiece 94. Continued movement from right to left of the carriage in FIGURE 7 will result in continued withdrawal of the tool slide 78 which in turn will continue the tapered cut on the workpiece 94.

In effect, the tool 80 on the tool post will follow an angular path to the axis of the lathe bed which will be precisely equal to the angle X. In other words, the tool 80 will follow a path precisely parallel to the axial center of the light beam 16 and the resulting taper on the workpiece may be accurately and precisely determined by the proper setting of the angle X.

It should be understood that by manipulation of the adjustment 88, the light beam 16 from the source 12 may be adjusted to either increase or decrease the angle X and the photocell and Polaroid disk, by any suitable adjustment means, may be moved in accordance with such adjustment of the beam so that the photocell will receive the light beam, as modulated by the rotating disk, in any set position of the adjustment 88. In fact, simple adjustment of the light beam by the means 88 could be made automatically, through a suitable control, to adjust the position of the photocell and Polaroid disk with its motor. But these features may be conventional and I have not shown the details for purposes of clarity.

In FIGURES 8 through 10 I have shown an additional modification and the same parts, where they appear, will be designated by the same reference numerals. For example, the light source is indicated at 12, the rotating Polaroid disk at 22, the four pole synchronous motor at 24 for rotating the Polaroid disk, and the split phase motor at 42, which rotates the screw 44 controlling the position of the frame 32 that carries the A and B Polaroid panels. As before, these panels have their planes of polarization oriented at precisely 90° to one another. I have not shown the light stop, but it could be located at any suitable position.

In this embodiment, I have shown two pins 94 and 96 which may be any distance apart. The light beam 16 passes through the rotating Polaroid panel or disk 22 and the source 12 is positioned at a suitable distance from the pins so that the light rays may be considered generally parallel when they hit the pins. In the upper portion of FIGURE 8, I have shown the light beam 16 magnified a number of times over what I have shown in the lower part, for clarity. In any event, the object is to strike the precise center between the pins 94 and 96 and it will be noted that the panels A and B extend fully on each side of the pins.

In FIGURE 8 the unbalanced condition is represented. In FIGURES 9 and 10 I have schematically shown the shadows of the pins which I have designated 94 and 96 since such shadows represent the pins. The shadows fall on the A and B panels and the portion in between the shadows will be illuminated by the light source. In FIGURE 9 the boundary line C between the A and B panels is decidedly to the right of the center line between the pins, as represented by their shadows 94 and 96. Accordingly, the majority of the light between the pins passing through the Polaroid panel will be A oriented and will produce an a type control signal. In FIGURE 8 the photocell would be located behind or above the frame 32, but I have not shown it, for clarity. The lead screw 44 threads into a hub 98 which may be either above or below the frame 32 so as not to obstruct or interfere with the light beam passing through the A and B panel.

The unbalanced condition shown in FIGURES 8 and 9 will produce a control signal which is the resultant of the A signal minus the B signal and will be an a type signal of the type shown in FIGURE 2. This control signal, when communicated to the motor 42, causes rotation of the screw 44 in a direction to center the boundary line C and moves the frame 32 to the left in FIGURE 8. The balanced condition is shown in FIGURE 10 in which the boundary line C is in the precise middle or exactly half way between the pins as represented by their shadows 94 and 96. Precisely the same amount of the A panel and B panel is present between the pins. While I have shown the pins 94 and 96 as precisely vertical, and having exactly parallel sides, it should be understood that they might be otherwise. For example, the FIGURE 8 embodiment might be used to scribe or establish the exact center between two adjacent teeth on a spur gear in which case the silhouette or shadow from each tooth would be an involute.

But, nevertheless, the amount of the A and B panels exposed to the light would have to be precisely equal before the system will reach its neutral position when the boundary line C arrives at the precise central point or location between the two teeth. In FIGURE 8 a suitable light stop may be used to limit the light beam 16 so that the edges of the beam fall on the pins 94 and 96, as shown. Or this might be done by a lens. Or suitable masking may be used to blank out the light on each side of the pins to prevent the light from falling on the A and B panels except in the area between the pins.

FIGURES 11 to 13, inclusive, represent a further embodiment of the invention, and the basic same reference numerals used in the previous forms will be applied. In this embodiment the system is employed to locate the position of the surface of a workpiece, such as a shaft 100, with relation to the beam 16 of light from the light source 12. The Polaroid frame 32 with panels A and B may be positioned on the other side of the shaft 100, and the center or boundary line C of this frame is adapted to be adjusted to any desired position, as by means of the screw member 102, either manually operated or otherwise. The Polaroid disk 22 is rotated by the synchronous motor 24 ahead of the photocell 18 and the motor 24 may be supplied with current at the base or reference frequency by leads 29 and 29a from any suitable source. The photocell is connected to the amplifier 20 which supplies the control signal through leads 38 and 40 to the split phase motor 42 which, in response to the control signal, rotates the screw 44.

In this embodiment, the position of the object or the surface of the shaft 100 relative to the axis of the light beam, is controlled by feeding a grinding wheel 104 against the surface of the shaft so that the surface may be ground and the diameter reduced. The axis of the shaft 100 is shown as extending transversely to the direction of the light beam.

The position of the grinding wheel, or the feed thereof, is controlled by the split phase motor 42. The field or reference signal winding is supplied by mains 26 and 28 which lead to the same base frequency source as lines 29 and 29a.

In this embodiment, once the frame 32 is adjusted and set, it is held in a stationary position and the surface of the shaft or workpiece is reduced by grinding or machining until the light passing through the two sections or panels of the frame 32 is of equal intensity, causing a static condition in the motor 42. Thus, equalization is brought about by my movement, or a change in position of the object, without moving the frame 32.

FIGURES 12 and 13 schematically illustrate the light beam pasing through the frame 32 both at the start of the grinding or machining operation and also at the finish thereof. In FIGURE 12, for example, the axis of the light beam is shown as coincident with the center or boundary line C of the two panels A and B, and the workpiece is initially positioned so as to block light out or shadow a portion of the lower section B with the upper margin of the shadow being indicated at 106. The lower boundary of the light beam with respect to the axis of the workpiece 100 represents the final desired distance of the surface of the workpiece from the center of the workpiece. Adjustment of the light beam to properly position the lower boundary may be accomplished through a suitable collimating lens 107. Since panels A and B are shown with equal width, the light flux passing through each will, before work starts, be in proportion to the height of each exposed panel above the workpiece. The A panel is fully exposed, as at 108, while only a portion of panel B is exposed, as at 110, due to the shadow effect of the workpiece 100. Thus, the modulated light received by the photocell will be unbalanced and an *a* type signal will be received by the armature windings of the synchronous motor 42 which rotates to screw 44 in a direction to feed the grinding wheel 104 into the workpiece. As the grinding wheel is fed in to grind the shaft or workpiece 100, the diameter of the workpiece or shaft is gradually reduced with the result that the lower boundary of the light beam reaching the frame member 32 moves downwardly until the condition shown in FIGURE 13 is obtained, where the actual lower boundary of the light beam, as represented by the shadow 106, is equidistantly spaced from the center or boundary line C of panels A and B with respect to the distance of the upper boundary of panel A. Thus, the exposed height 112 of panel B precisely equals the exposed height of panel A. A suitable stop plate, such as at 30 in FIGURE 1, could be positioned between the light source 12 and the photocell 18.

As an example of the FIGURE 11 embodiment, the upper and lower panels might be 0.100 in. in height. The silhouette of the workpiece or shaft might initially cover one-half of the lower panel so that the transmitted light flux through the lower panel would only be 0.050 in. high. The width of the Polaroid panels is not important; they could be either wide or narrow but preferably narrow. However, they should be the same width or symmetrical on each side of center line or boundary C. They could be other than square or rectangular, if desired, but they should be symmetrical or in a predetermined proportion and relation.

In FIGURE 14 I have shown a variation of a system used as, functioning as or in the form of a measuring device. The same reference numerals have been applied to the same fundamental elements or parts as were previously used, and new numerals are only applied to new or different parts. As before, the light source 12 projects a beam of light 16 through the orienting and modulating source 22, through the light stop or mask 30, the panels A and B to the photocell 18. The signal from the photocell passes through the transformer 19 and amplifier 20 and by suitable leads is carried to the windings of a suitable two phase motor 114 which has a pointer 116 or the like on its shaft cooperating with a suitably graduated dial or scale 118. As shown, the pointer is suitably spring biased by opposing springs 120 to bring the pointer to zero when no signal is supplied from the photocell. The other windings of the motor are supplied with the reference phase signal by the mains 26 and 28.

The position of the frame 32 may be suitably adjusted as by the screw 44 which, in this case, may have a manually operable hand wheel or crank 122.

The FIGURE 14 form may be used as a highly accurate measuring device since the precise displacement of the frame 33 will be reflected in the position of the pointer 116. If either an *a* or *b* type signal is received by the windings of the two phase motor, the torque of the motor will rotate the pointer to a position precisely proportional to such torque. When no signal is received by the windings of the motor 114, the pointer will be zeroed by the springs 120.

Some of the advantages and a few of the fundamentally important characteristics of the system are as follows. A highly precise and accurate balance is required between the two Polaroid panels before a stable condition is reached. The modulated light flux received by the photocell from the A and B panels must be precisely equal to prevent a control signal from being generated and sent to the motor. Thus, accuracy in all uses or applications of the system will be at a maximum.

The distances employed may be quite large. For example, the distance between the photocell and the light source may be as much as 100 feet or more. The overall length of the frame carrying the A and B Polaroid panels may also be quite large so that the area scanned or covered by the frame may be substantial. For example, regardless of the length of either panel, if the light beam falls entirely on any part of one of the panels, the motor 42 will automatically move the boundary line C between the two panels toward the light beam, regardless of whether the distance involved is a matter of inches, feet or otherwise.

The motor receiving the control signal may move either the frame carrying the Polaroid panels, for example, as in the FIGURES 1 through 10 forms, or the motor may operate an indirect object, such as in the FIGURE 11 form.

Most systems use either two sources of light or one source with a beam splitter. But this requires a very delicate balance since the various filaments, reactive areas, cathodes, etc. of the light source beam splitter, photocells, etc. must be precisely the same which, in practice, is impossible. Accordingly, errors will inherently exist in such systems. But in my system only one light source and one photocell is used. Accordingly, any errors, for example in the filament of the light, will apply equally as well to the light transmitted through the A panel as to the light through the B panel. Accordingly, such error will be cancelled out. The same is true if photocells vary somewhat from one to another. In other words, the same optical degradations or inaccuracies that occur at any point in the system will apply on both sides of the balance and, in effect, will cancel each other out.

For additional accuracy I might use a suitable refractory wedge to bring the light passing through panels A and B on to the same area of the photocell. If desired, the luminosity from area A might be superimposed on precisely the same area as the luminosity from area B by inserting a simple refractory prism in the path of the light from A. But I have not shown such an arrangement and the details will be obvious.

In essence, this system is phase-amplitude responsive since the control signal to the split phase motor is always 90° out-of-phase, either leading or lagging, with the reference signal. The amplitude of the control signal varies from a maximum, when the luminosity is passing entirely through either panels A or B, to a minimum when precisely the same amount of luminosity is passing through both panels A and B. The intermediate amplitudes are in proportion to the luminosity through one panel less the luminosity through the other.

It will be noted that the rotating polaroid disk may be on either side of the divided frame, the only criterion being that it be inserted between the light source and the photocell. The invention, as shown in the various embodiments, has particular advantage with heavy machinery, for example lathes, machinery for the aircraft industry, and the like. While I have shown and have referred to a simple filament type lamp as the source of luminosity, I might use gaseous type lamps, such as mercury vapor filled lamps with sub-zero thermal inertia.

The measuring arrangement or system illustrated in FIGURE 14 may be applied or used, for example, in some of the previous modifications. For exomple, in FIGURE 11 the signal from the photocell could be led to a suitable torque motor so that the shadowed portion of the shaft 100 would be reflected on a suitable dial or scale. The grinding wheel might be fed in manually and the operator could observe when the proper shaft dimension was reached by observing the position of the pointer. The same analogy applies to the other modifications.

Figure 15:
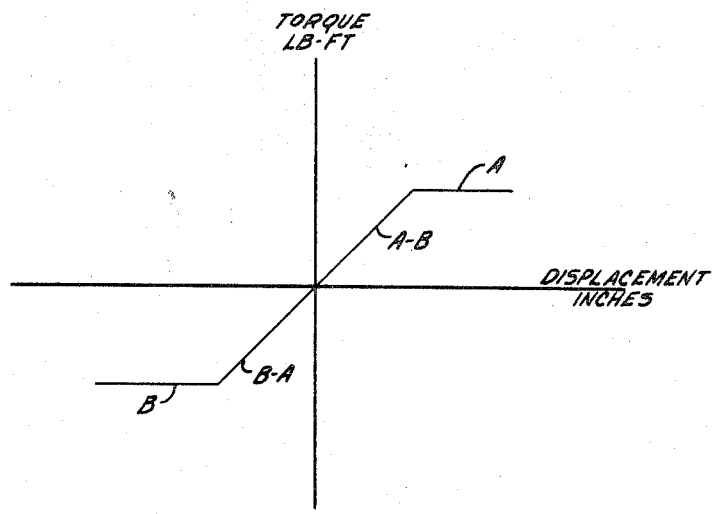
FIGURE 15 is a graphic illustration of the torque-displacement characteristics of the invention.

An important characteristic of the invention is that the displacement of the frame gives a lineal signal. For example, consider FIGURE 15 which is a graph of the displacement of the frame, for example in inches, as the abscissa and the motor torque, for example in pound-feet, as the ordinant. Rather than the resulting signal being sinusoidal, it extends lineally on both sides of the zero point up to or down to a maximum which is either all A or all B. Thereafter for any additional displacement the motor torque or the signal amplitude remains constant. Several known systems produce a sinusoidal signal. However my system has the advantage that additional displacement does not return the signal to zero amplitude. It is also of advantage as compared to systems that produce an ever increasing motor torque or signal amplitude with additional displacement.

The system also has the advantage that it is relatively insensitive to outside light as long as the operating or control frequency of the system is not in the general range of the frequency of outside light sources. This has the advantage that the device can be used in normal daylight, for example, such as in a plant along the lines of the FIGURE 6 form, without having to use any light shields or other protective equipment around the basic elements of the system since I am using modulated light. It should be understood that I may use suitable electronic filters to filter out the stray signals that would otherwise come in from various outside sources.

I have shown a Polaroid disk driven by a synchronous motor as the means for orienting and modulating the light beam. However, I might use a static device to orient and modulate the light but since these are considered conventional, I shall not go into detail. Suffice it to say that a motor driven disk is probably the simplest form and therefore the most desirable.

While I have shown the plans of polarization of the A and B panels precisely at right angles and contacting in a well defined boundary line C, it might be otherwise. In certain applications the plans of polarization of the two panels might be at a predetermined suitable angle other than 90°. Also the panels might be spaced with respect to each other and not touching. The panel need not necessarily be the same size and the boundary line might be offset somewhat. But, the important point is that I use two panels which have their planes of polarization differently oriented so as to be at an angle, whether or not they actually touch and whether or not they are the same size.

Another advantage of the system is that the modulated light may be reflected by any suitable lens system. For example, my invention might be used in a comparator type setup, but the details are not important.

I have referred to the use of generally parallel light and it should be understood that the invention has particular advantage with diffused light or a magnification arrangement. For example, in FIGURE 11 a suitable magnifying lens could be positioned between the work piece 100 and the frame 32 so that the light and shaft silhouette would be magnetized accordingly. The accuracy of the shaft dimension would be increased in direct proportion to the magnification factor over the accuracy of the panels A and B and photocell 18. The same is true of diffused light. In short, the system may be used to obtain quite accurate dimensions since the light beam may be magnified.

Whereas I have shown and described certain operative forms of the invention, it should be understood that this showing is to be taken in an illustrative or diagrammatic sense only. There are many modifications to the invention, which will fall within the scope and spirit thereof and which will be apparent to those skilled in the art. The scope of the invention should be limited only by the scope of the hereinafter appended claims.

I claim:

1. A method of establishing the position of an object with respect to a reference line; including the steps of varying the position of the object in accordance with the phase relations of a reference signal and a control signal by moving the object in one direction when the control signal leads the reference signal and in the opposite direction when the control signal lags the reference signal, and varying the amplitude of the control signal relative to the reference signal as a function of the actual position of the object with respect to the reference line.

2. A method of positioning an indicator with respect to a scale; including the steps of varying the phase relations of a reference signal and a control signal in accordance with the distance between a balance line and a reference line so that the indicator is moved in one direction with respect to the scale when the reference signal leads the control signal and is moved in the opposite direction with respect to the scale when the reference signal lags the control signal, and varying the phase of the control signal relative to the reference signal by varying the relative amplitude of two superimposed signals 180° out-of-phase with one another and each 90° out-of-phase with the reference signal whereby the phase of the control signal is the phase of one of the two superimposed signals having a greater amplitude.

3. The method of claim 2 wherein the amplitudes of the two superimposed signals are equal to one another to produce no control signal when the object is at a preselected position with relation to the reference line.

4. A method of positioning an object relative to a reference line; including the steps of moving the object in opposite directions toward the reference line in response to the phase relations of a reference signal and a control signal which are 90° out-of-phase with each other, and varying the control signal as a function of the respective amplitudes of two 180° out-of-phase signals with the same frequency, by increasing the amplitude of one of the two signals when the object is on one side of the reference line while at the same time decreasing the amplitude of the other of the two signals and vice versa when the object is on the other side of the predetermined line, the amplitudes of the two signals being equal when the object is at a predetermined position relative to the reference line whereby the two signals balance one another producing no control signal and bringing about a static condition of the object.

5. A method of establishing a line at a predetermined position with respect to a reference line; including the steps of varying the position of the line as a function of the phase-amplitude relations between a reference signal and a control signal, causing the control signal to have a predetermined out-of-phase relation with the reference signal when the line is away from the reference line, and varying the amplitude of the control signal relative to the reference signal as the line is moved relative to the reference line.

6. The method of claim 5 wherein the control signal is varied as a function of the difference between the amplitudes of two signals having the same frequency but being out-of-phase with one another by 180°, and including the step of inversely varying the amplitudes of the two signals as the line is moved relative to the reference line.

7. The method of claim 5 wherein the amplitude of the control signal is the difference between the amplitudes of two sub-control signals out-of-phase with one another by a predetermined number of electrical degrees but with the same frequency, and the control signal reaches a null point condition and causes a static condition of the line when the two sub-control signals are of equal amplitude.

8. A method of controlling a servo mechanism wherein an object is moved as a function of the relation between a reference signal and a control signal and is held in a static position when the control signal has a predetermined value; including the steps of causing the control signal to have a leading phase relation to the reference signal when the object is on one side of a reference line, causing the control signal to have a lagging phase relation to the reference signal when the object is on the other side of the reference line, and causing the control signal to have a null point value when the object is at the predetermined line.

9. A method of varying a control signal with respect to a reference signal in a servo mechanism to thereby cause predetermined movements of an object controlled by the servo mechanism; including the steps of varying the control signal as a function of the relative amplitudes between two signals having the same frequency but out-of-phase with one another by a predetermined number of electrical degrees, and varying the relative amplitudes of the two signals as a function of changes in the position of the object controlled by the servo mechanism.

10. A control signal generating assembly including a source providing a single beam of light, means responsive to the beam of light for generating a signal, a Polaroid disk constructed to rotate through the beam of light between the source and the light responsive means so that the plane of polarization of the beam on the light responsive means will be cyclically varied, and a movable cooperating Polaroid member effective in the beam of light between the source and the light responsive means and having at least two sections with the planes of polarization thereof extending at right angles to each other so that the light falling on the light responsive means will be modulated in accordance with the cyclical positions of the plane of polarization of the disk relative to the planes of polarization of the two sections of the cooperating Polaroid member.

11. The structure of claim 10 further characterized by and including means for moving the cooperating Polaroid member so that either one or both of the Polaroid sections may cooperate with the Polaroid disk to modulate the single beam of light.

12. The structure of claim 10 wherein the movable cooperating Polaroid member includes a boundary line between the two sections which are contiguous and have their planes of polarization immediately adjacent and extending at right angles, whereby a portion of the light beam may pass through each of the sections.

13. An apparatus for determining the position of a line with respect to the optical axis of a light beam, including a source constructed to provide a single beam of light, means responsive to the beam of light for generating and transmitting a signal varying in accordance with the intensity thereof, a Polaroid disk positioned in the beam of light with its plane of polarization extending uniformly in one direction and means for rotating the disk at a uniform speed so that the plane of polarization of the light passing through the disk will be accordingly rotated, a frame adapted to be moved to a predetermined position with relation to the axis of the beam of light, means for moving the frame, a second Polaroid member on the frame and adapted to be positioned in the beam of light to cooperate with the Polaroid disk, the second Polaroid member having two side-by-side Polaroid sections positioned so that the light beam may pass through both of them at the same time in at least one position of the frame, the planes of polarization of the two sections being at an angle to one another, whereby the light beam is periodically interrupted by the cooperating action of the Polaroid disk and the second Polaroid member, and means for indicating the magnitude of the signal transmitted by the light responsive means.

14. An apparatus for locating an object in a predetermined position with respect to a reference line, including means providing a fixed beam of light for defining the referenec line, means for moving the object relative to the predetermined position, and means cooperating with the beam of light and responsive to the position of the object relative to the predetermined position for controlling the moving means so that the object will always be moved into coincidence with the reference line.

15. A method of generating a signal indicative of the distance between a balance line defined by a plurality of out-of-phase light orienting and transmissive panels and the optical axis of a light beam, including the steps of projecting the light beam through at least one of the panels to orient it, separately orienting the beam, modulating such separate orientation in predtermined phase relation to a reference signal, summing the thus oriented and modulated light, and generating a variable phase control signal from the summation.

16. The method of claim 15 further characterized by and including the steps of actuating an indicator in response to the thus generated variable phase control signal.

17. The method of claim 15 further characterized by and including the step of moving the out-of-phase panels in response to thus generated variable phase control signal until the summation is zero.

References Cited in the file of this patent
UNITED STATES PATENTS

| | | |
|---|---|---|
| 2,194,910 | Pineo | Mar. 26, 1940 |
| 2,455,532 | Sunstein | Dec. 7, 1948 |
| 2,651,771 | Palmer | Sept. 8, 1953 |